(12) United States Patent
Hong et al.

(10) Patent No.: US 10,939,409 B2
(45) Date of Patent: Mar. 2, 2021

(54) DATA TRANSMISSION METHOD AND DEVICE, USER EQUIPMENT, AND BASE STATION

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/216,330

(22) Filed: Dec. 11, 2018

(65) Prior Publication Data
US 2019/0124624 A1    Apr. 25, 2019

Related U.S. Application Data

(63) Continuation of application No. PCT/CN2016/087846, filed on Jun. 30, 2016.

(51) Int. Cl.
*H04W 72/00* (2009.01)
*H04B 17/318* (2015.01)
(Continued)

(52) U.S. Cl.
CPC ........ *H04W 72/005* (2013.01); *H04B 17/318* (2015.01); *H04L 43/16* (2013.01);
(Continued)

(58) Field of Classification Search
CPC ...... H04L 43/16; H04B 17/318; H04W 28/08; H04W 72/005; H04W 28/10; H04W 88/06; H04W 88/10; H04W 84/12
See application file for complete search history.

(56) References Cited

U.S. PATENT DOCUMENTS 9,838,282 B2 * 12/2017 Dudda ................ H04L 1/1841
2007/0177592 A1    8/2007 Mooney et al.
(Continued)

FOREIGN PATENT DOCUMENTS

CN    102164390 A    8/2011
CN    102215530 A    10/2011
(Continued)

OTHER PUBLICATIONS

English version of International Search Report of PCT Application No. PCT/CN2016/087846, dated Mar. 13, 2017, issued by the ISA/CN—State Intellectual Property Office of the P.R. China.
(Continued)

*Primary Examiner* — Brian D Nguyen
(74) *Attorney, Agent, or Firm* — Finnegan, Henderson, Farabow, Garrett & Dunner, L.L.P.

(57) ABSTRACT

A method for transmitting data includes: determining whether a length of cached data of user equipment (UE) is no less than a first preset threshold; in response to determining that the length of the cached data of the UE is no less than the first preset threshold, dividing, in a preset mode, the cached data into two groups of data; and uploading the two groups of data to a base station respectively through a mobile network and a wireless local area network (WLAN).

16 Claims, 11 Drawing Sheets

(51) Int. Cl.
*H04L 12/26* (2006.01)
*H04W 28/08* (2009.01)
*H04W 28/10* (2009.01)
*H04W 88/06* (2009.01)
*H04W 88/10* (2009.01)
*H04W 84/12* (2009.01)

(52) U.S. Cl.
CPC ........ *H04W 28/08* (2013.01); *H04W 28/10* (2013.01); *H04W 88/06* (2013.01); *H04W 88/10* (2013.01); *H04W 84/12* (2013.01)

(56) References Cited

U.S. PATENT DOCUMENTS

| | | | |
|---|---|---|---|
| 2008/0201489 | A1 | 8/2008 | Morinaga |
| 2013/0088968 | A1* | 4/2013 | Kim ................... H04L 47/11 370/235 |
| 2014/0133298 | A1 | 5/2014 | Han et al. |
| 2014/0140335 | A1 | 5/2014 | Wang et al. |
| 2015/0055622 | A1 | 2/2015 | Roh |
| 2015/0092553 | A1 | 4/2015 | Sirotkin et al. |
| 2016/0021673 | A1* | 1/2016 | Ahmadzadeh ...... H04W 72/085 370/331 |
| 2016/0150425 | A1* | 5/2016 | Kuru ................... H04W 24/06 370/252 |
| 2018/0206147 | A1* | 7/2018 | Lee .................... H04L 47/28 |
| 2018/0206282 | A1* | 7/2018 | Singh .................. H04W 76/15 |
| 2018/0213435 | A1* | 7/2018 | Kim .................... H04W 48/14 |
| 2018/0270742 | A1* | 9/2018 | Bergstrom .......... H04W 40/244 |
| 2019/0068331 | A1* | 2/2019 | Lee .................... H04L 1/18 |
| 2019/0320339 | A1* | 10/2019 | Laselva ............... H04W 52/246 |

FOREIGN PATENT DOCUMENTS

| | | |
|---|---|---|
| CN | 103096474 A | 5/2013 |
| CN | 103974338 A | 8/2014 |
| CN | 104168605 A | 11/2014 |
| CN | 105376801 A | 3/2016 |
| EP | 1 962 455 A1 | 8/2008 |
| EP | 2 723 120 A1 | 4/2014 |
| EP | 2 725 825 A1 | 4/2014 |
| EP | 2 773 141 A1 | 9/2014 |
| EP | 3 148 289 A1 | 3/2017 |
| JP | 2014222846 A | 11/2014 |
| KR | 20160072227 A | 6/2016 |
| RU | 2532416 C2 | 11/2014 |
| WO | WO 2012159344 A1 | 11/2012 |
| WO | WO 2015/059055 A2 | 4/2015 |
| WO | WO 2015115205 A1 | 8/2015 |
| WO | WO 2015/187285 A1 | 12/2015 |
| WO | WO 2015192317 A1 | 12/2015 |

OTHER PUBLICATIONS

3GPP TS 43.129 V13.0.0 (Dec. 2015), Technical Specification, *3rd Generation Partnership Project; Technical Specification Group GSM/EDGE Radio Access Network; Packet-switched handover for GERAN A/Gb mode*; Stage 2 (Release 13), pp. 1-95, dated Dec. 2015, http://www.3gpp.org.

English translation of International Search Report and Written Opinion of PCT Application No. PCT/CN2016/087846, dated Mar. 13, 2017, issued by the ISA/CN—State Intellectual Property Office of the P.R. China.

Extended Search Report for European Application No. 16906704.8 from the European Patent Office, dated Apr. 4, 2019.

First Office Action dated Sep. 12, 2018, in counterpart Chinese Application No. 201680000558.7 and English translation thereof.

First Office Action dated Nov. 6, 2019, in counterpart Japanese Application No. 2018-564753 and English translation thereof.

First Office Action dated Dec. 20, 2019, in counterpart Korean Application No. 10-2018-7035871 and English translation thereof.

Huawei, HiSilicon, Uplink bearer configuration and BSR procedure for eLWA, 3GPP TSG-RAN WG2 Meeting #94 R2-163777, http://www.3gpp.org/ftp/tsg_ran/WG2_RL2/TSGR2_94/Docs/R2-163777—May 27, 2016, 3 pgs.

Brik et al., "Wireless Device Identification with Radiometric Signatures", the *MobiCom '08*, Sep. 14-19, 2008, 13 pgs.

First Office Action dated Aug. 8, 2019, in counterpart Russian Application No. 2018146952 and English translation thereof.

Second Office Action of the Korean application No. 10-2018-7035871, dated Jun. 25, 2020.

* cited by examiner

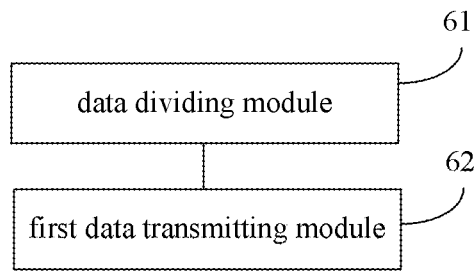
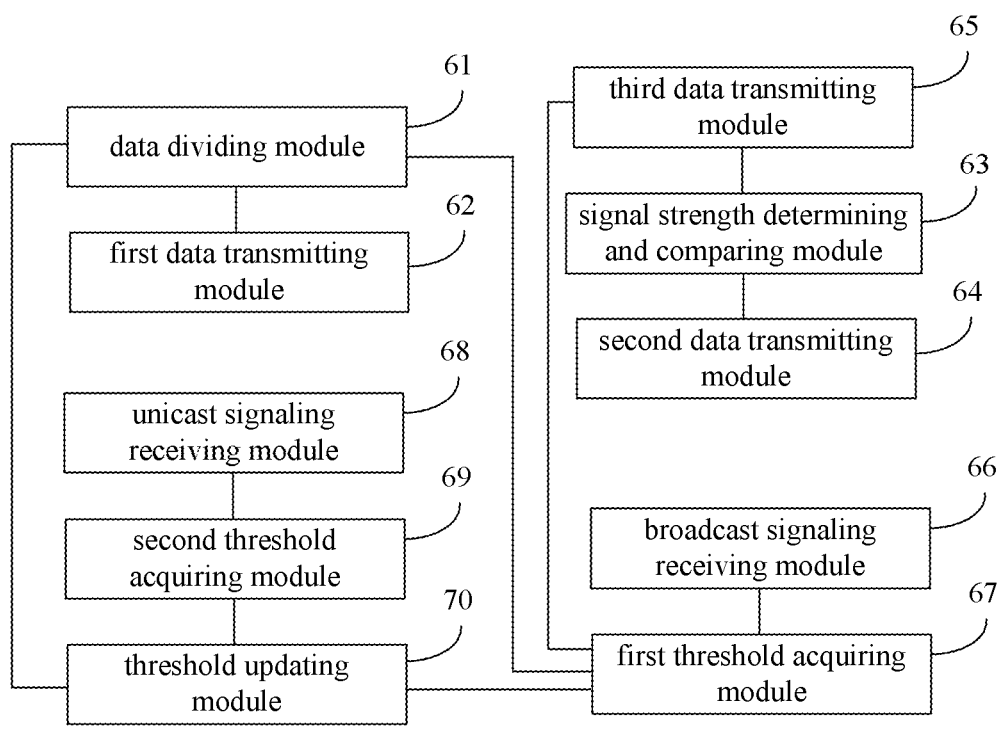

DATA TRANSMISSION METHOD AND DEVICE, USER EQUIPMENT, AND BASE STATION

CROSS-REFERENCE TO RELATED APPLICATIONS

This application is a continuation of International Application No. PCT/CN2016/087846, filed Jun. 30, 2016, the entire contents of which are incorporated herein by reference.

TECHNICAL FIELD

The present disclosure generally relates to the field of communication, and in particular to a method and device for transmitting data, user equipment (UE), and a base station.

BACKGROUND

With rapid development of wireless communication technology, sharp increase in a number of wireless users, and rapid emergence of High-Definition (HD) multimedia streaming services, there is an increasing shortage of wireless spectral resources. Meanwhile, there is an increasingly high user requirement on a network speed and continuity in network coverage. Expensive finite authorized spectra are failing to meet an increasing wireless demand In order to relieve a pressure on an authorized network, an operator starts to consider meeting said challenges by utilizing an unauthorized frequency band with relatively rich resources.

In related art, in a project (serial number Rel-13) on Long Term Evolution (LTE) network and Wireless Local Area Networks (WLAN) Aggregation (LTE-WLAN Aggregation, LWA for short), the 3rd Generation Partnership Project (3GPP) researches on implementing a dynamic load balance between an LTE network and a WLAN by in-depth fusion of the LTE network and the WLAN at a wireless side through LWA. The 3GPP Rel-13 LWA focuses merely on downlink. With Enhanced LTE-WLAN Aggregations (eLWA), there has been no solution for controlling uplink data transmission to a base station by UE through an LTE network and a WLAN.

SUMMARY

According to a first aspect of the present disclosure, a method for transmitting data includes: determining whether a length of cached data of user equipment (UE) is no less than a first preset threshold; in response to determining that the length of the cached data of the UE is no less than the first preset threshold, dividing, in a preset mode, the cached data into two groups of data; and uploading the two groups of data to a base station respectively through a mobile network and a wireless local area network (WLAN).

According to a second aspect of the present disclosure, a method for receiving transmitted data includes: determining a state of a network load of a cell where user equipment (UE) is located; determining, according to the state of the network load, a first preset threshold to be adopted by the UE; receiving two groups of data uploaded by the UE respectively through a mobile network and a wireless local area network (WLAN), wherein the UE divides cached data into the two groups of data in response to determining that a length of the cached data is no less than the first preset threshold; and reconstructing, using the two groups of data, a data packet in a same data format as that adopted at the UE.

According to a third aspect of the present disclosure, user equipment (UE) includes: a processor; and a memory storing instructions executable by the processor, wherein the processor is configured to: determine whether a length of cached data of the UE is no less than a first preset threshold; in response to determining that the length of the cached data of the UE is no less than the first preset threshold, divide, in a preset mode, the cached data into two groups of data; and upload the two groups of data to a base station respectively through a mobile network and a wireless local area network (WLAN).

According to a fourth aspect of the present disclosure, a base station includes: a processor; and a memory storing instructions executable by the processor, wherein the processor is configured to: determine a state of a network load of a cell where user equipment (UE) is located; determine, according to the state of the network load, a first preset threshold to be adopted by the UE; receive two groups of data uploaded by the UE respectively through a mobile network and a wireless local area network (WLAN), wherein the UE divides cached data into the two groups of data in response to determining that a length of the cached data is no less than the first preset threshold; and reconstruct, using the two groups of data, a data packet in a same data format as that adopted at the UE.

Technical solutions according to embodiments of the present disclosure may have advantages as follows.

As the mobile network and the WLAN are communication networks independent of each other, when the mobile network is heavily loaded in a cell, with the technical solutions according to embodiments herein, the UE is controlled to upload one part of the cached data to the base station through the mobile network and upload the other part of the cached data to the base station through the WLAN, such that resources of the mobile network and of the WLAN may be better integrated, improving utilization of the WLAN, greatly relieving a burden of the mobile network in data transmission, improving UE performance in data transmission.

The general description above and detailed description below are exemplary and explanatory only, and are not intended for limiting the present disclosure.

BRIEF DESCRIPTION OF THE DRAWINGS

Accompanying drawings herein are incorporated in and constitute a part of this specification, illustrate embodiments consistent with the disclosure and, together with the description, serve to explain the principles of the disclosure.

FIG. 6 is a block diagram of a device for transmitting data according to an exemplary embodiment.

FIG. 7 is a block diagram of a device for transmitting data according to an exemplary embodiment.

DETAILED DESCRIPTION

Exemplary embodiments will be elaborated herein, examples of which are illustrated in the accompanying drawings. In drawing-related description below, unless indicated otherwise, identical references in different drawings represent identical or like elements. Implementations in the following exemplary embodiments do not represent all implementations according to the disclosure. On the contrary, they are merely examples of devices and methods according to some aspects of the disclosure as elaborated in the appended claims.

Figure 1A:
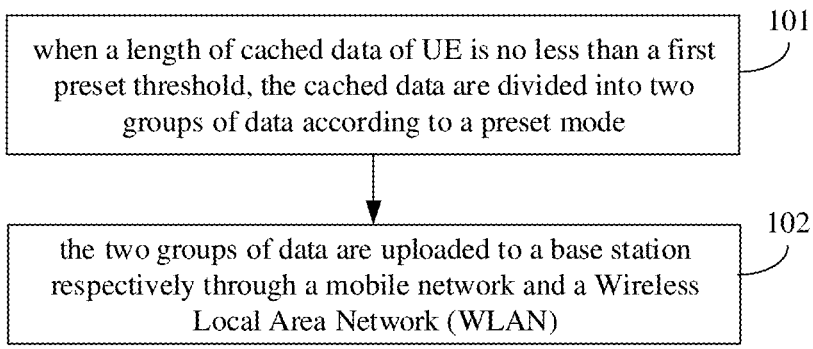
FIG. 1A is a flowchart of a method for transmitting data according to an exemplary embodiment.
Figure 1B:
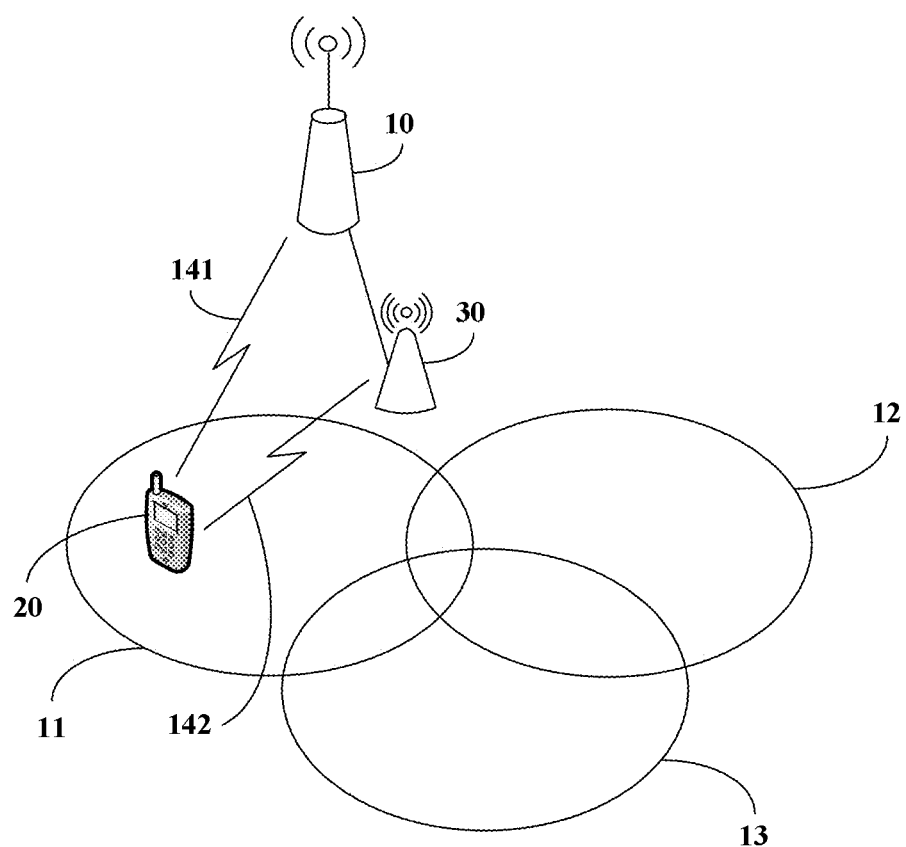
FIG. 1B is a diagram of a scene of a method for transmitting data according to an exemplary embodiment.

FIG. 1A is a flowchart of a method 100 for transmitting data according to an exemplary embodiment. FIG. 1B is a schematic diagram of a scene of using the method 100 for transmitting data according to an exemplary embodiment. The method 100 for transmitting data may apply to UE. As shown in FIG. 1A, the method 100 for transmitting data includes steps 101-102 as follows.

In step 101, when a length of cached data of UE is no less than a first preset threshold, the cached data are divided into two groups of data according to a preset mode.

The cached data may be a data packet to be sent to a base station by the UE through an uplink. The data packet to be uploaded by the UE may be cached in a cache of the UE, forming the cached data, when a wireless network where the UE is located is, e.g., heavily loaded. The cache may be a Packet Data Convergence Protocol (PDCP) cache. The length of the cached data generally may not exceed a length of data that can be cached by the cache, i.e., cache capacity.

The first preset threshold may be determined according to a state of a network load of a cell where the UE is located. When the length of the cached data is greater than the first preset threshold, it means that congestion occurs in the wireless network being accessed by the UE. To ensure that the UE may send the cached data to the base station, the cached data may be divided into, e.g., two groups of data according to the preset mode, such as a first group of data and a second group of data. For example, when the cached data are of a length of 12 bits, which is greater than the first preset threshold, e.g., a length of 10 bits, the cached data may be grouped according to the preset mode. The preset mode may be a grouping rule preset between the UE and the base station. The cached data may be grouped in units of bits. In one embodiment, according to the preset mode, a first half of the bits of the cached data are set as the first group of data, and a second half of the bits of the cached data are set as the second group of data. For example, the first 6 bits in the 12 bits may be set as the first group of data, and the second 6 bits may be set as the second group of data.

In step 102, the two groups of data are uploaded to a base station respectively through a mobile network and a wireless local area network (WLAN).

For example, the first group of data and the second group of data may be used respectively to form data packets. The UE may add, respectively in the data packets, identifiers respectively for identifying the first group of data and the second group of data, and position identifiers respectively for identifying positions of the first group of data and the second group of data in all data to be sent by the UE, such that the base station may identify the first group of data and the second group of data according to these identifiers, and may reconstruct the cached data originally generated by the UE using the first group of data and the second group of data according to these identifiers.

In an exemplary scene as shown in FIG. 1B, the mobile network may be an LTE network and the base station may be an evolved Node B (eNB). The scene shown in FIG. 1B may include an eNB 10, UE 20, and a wireless Access Point (AP) 30 of a WLAN. The eNB 10 may cover, e.g., three cells Cell 11, Cell 12, and Cell 13. The UE 20 may be located in the Cell 11. Under a circumstance, the UE 20 may need to transmit data to the eNB 10 through a first link 141 in the LTE network. When the LTE network is heavily loaded in the Cell 11, the UE 20 may cache the data to be transmitted in a cache. To improve efficiency in data transmission by a communication system, it may be detected, according to a technical solution herein, whether the length (such as 12 bits) of the cached data in the cache is greater than the first preset threshold (such as a length of 10 bits). When the length of the cached data is greater than the first preset threshold, the UE 20 may split the cached data into the first 6 bits and the second 6 bits, set the first 6 bits as the first group of data, set the second 6 bits as the second group of data, and then transmit the first 6 bits to the eNB 10 through the first link 141 of the LTE network, and transmit the second 6 bits to the AP 30 through a second link 142 of the WLAN. The AP 30 may then forward the second 6 bits to the eNB 10. When the LTE network is heavily loaded in the Cell 11, the UE is controlled, through the first preset threshold, to transmit data to the eNB 10 through the second link 142 of the WLAN, which effectively relieves a pressure on the first link 141 in data transmission.

The mobile network and the WLAN are communication networks independent of each other. When the mobile network is heavily loaded, with the method 100, the UE is controlled to upload one part of the cached data to the base station through the mobile network and upload another part of the cached data to the base station through the WLAN, such that resources of the mobile network and of the WLAN may be better integrated, improving utilization of the WLAN, greatly relieving a burden of the mobile network in data transmission, improving UE performance in data transmission.

In some embodiments, the method 100 for transmitting data may also include the following steps. When the length of the cached data is less than the first preset threshold, a signal strength of the mobile network and a signal strength of the WLAN may be determined and compared. When the signal strength of the mobile network is no less than the signal strength of the WLAN, the cached data may be transmitted through the mobile network. When the signal strength of the mobile network is less than the signal strength of the WLAN, the cached data may be transmitted through the WLAN.

In some embodiments, the method 100 for transmitting data may also include the following steps. Broadcast signaling sent by the base station may be received. The first preset threshold may be acquired by analyzing the broadcast signaling.

In some embodiments, the method 100 for transmitting data may also include the following steps. Unicast signaling sent by the base station may be received. A second preset threshold may be acquired by analyzing the unicast signaling. The second preset threshold may be less than the first preset threshold. The first preset threshold may be updated with the second preset threshold. The cached data may be stored in a PDCP cache.

Refer to an embodiment below for details in data transmission.

With the method 100, resources of the mobile network and of the WLAN may be better integrated, improving utilization of the WLAN, greatly relieving a burden of the mobile network in data transmission, improving UE performance in data transmission.

Figure 2:
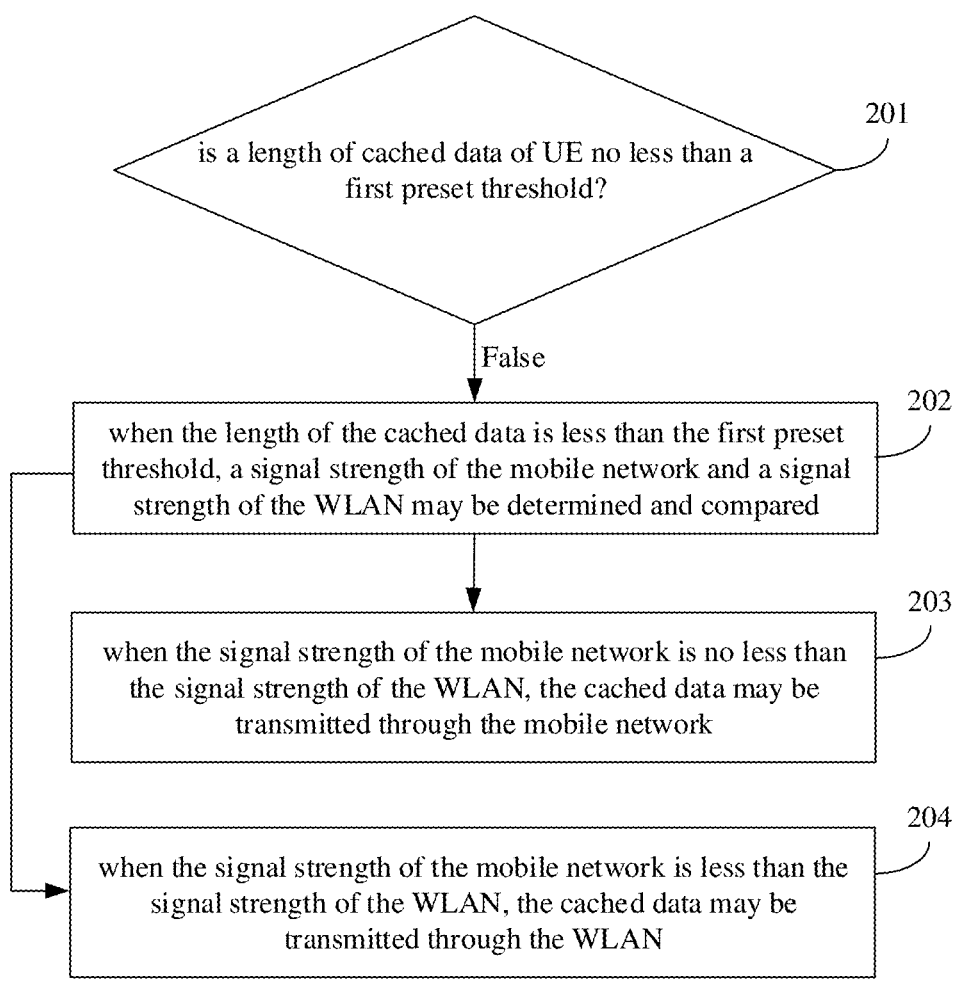
FIG. 2 is a flowchart of a method for transmitting data according to an exemplary embodiment.

FIG. 2 is a flowchart of a method 200 for transmitting data according to an exemplary embodiment. The method 200 may be used with the method 100 (FIG. 1A) where the cached data are of a length less than the first preset threshold. As shown in FIG. 2, the method 200 may include the following steps.

In step 201, it is determined whether a length of the cached data of UE is no less than the first preset threshold. When the length of the cached data is no less than the first preset threshold, the cached data may be uploaded to the base station according to the flow of the method 100 (FIG. 1A), which will not be repeated here. When the length of the cached data is less than the first preset threshold, step 202 may be executed.

In step 202, when the length of the cached data is less than the first preset threshold, a signal strength of the mobile network and a signal strength of the WLAN may be determined and compared.

In step 203, when the signal strength of the mobile network is no less than the signal strength of the WLAN, the cached data may be transmitted through the mobile network.

In step 204, when the signal strength of the mobile network is less than the signal strength of the WLAN, the cached data may be transmitted through the WLAN.

In the exemplary scene shown in FIG. 1B, if the UE 20 may simultaneously access both the mobile network and the WLAN, before the length of the cached data in the cache of the UE 20 reaches the first preset threshold, for better user experience, a link to be adopted by the UE 20 may be determined according to the strength of the signal of the mobile network and the strength of the signal of the WLAN. For example, when the strength of the signal of the mobile network is no less than the strength of the signal of the WLAN, the cached data may be uploaded to the eNB 10 through the first link 141. When the strength of the network signal of the mobile network is less than the strength of the signal of the WLAN, the cached data may be uploaded to the eNB 10 through the second link 142, such that the UE 20 may transmit the data to the eNB 10 through a better uplink.

The network adopted by the UE is adjusted according to the strength of the signal of the mobile network and the strength of the signal of the WLAN, thereby ensuring that the UE may transmit data through an optimal network, avoiding data accumulation in the cache, effectively improving UE performance in data transmission.

Figure 3:
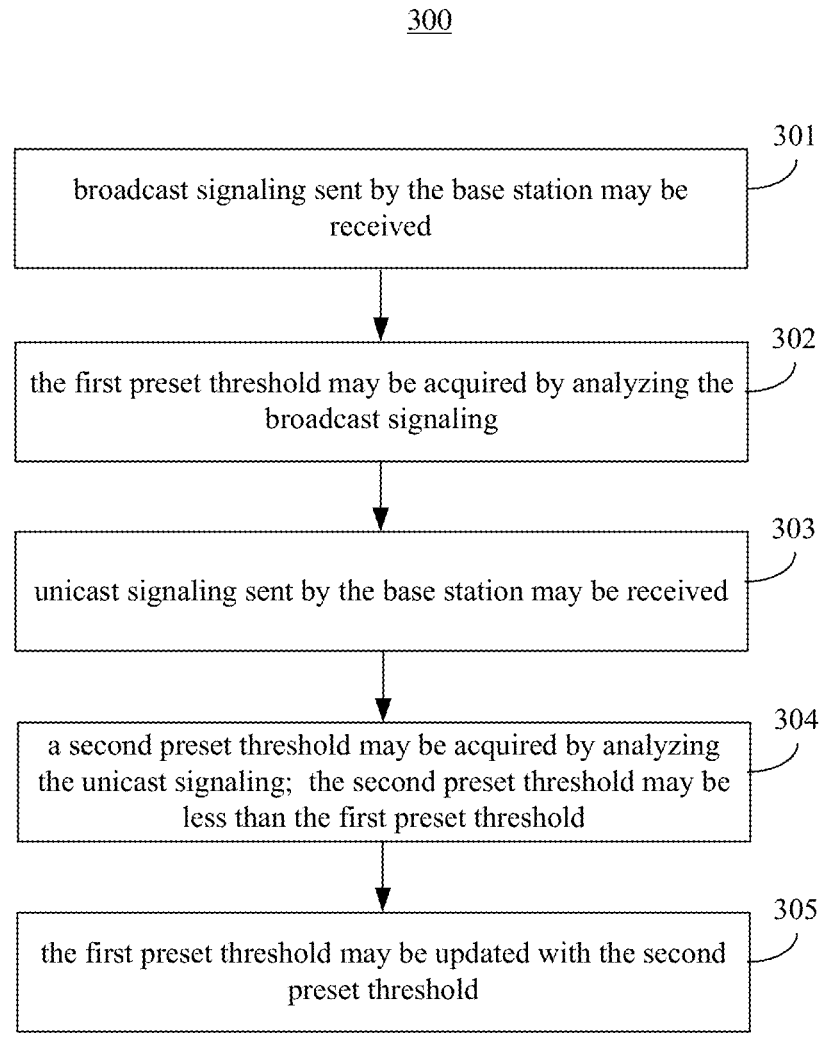
FIG. 3 is a flowchart of a method for transmitting data according to an exemplary embodiment.

FIG. 3 is a flowchart of a method 300 for transmitting data according to an exemplary embodiment herein. The method 300 may be used with the method 100 (FIG. 1A) for acquiring and updating the first preset threshold. Referring to FIG. 1B and FIG. 3, the method 300 may include the following steps.

In step 301, broadcast signaling sent by the base station may be received.

In step 302, the first preset threshold may be acquired by analyzing the broadcast signaling.

In steps 301 and 302, the eNB 10 may allocate a first preset threshold to UE (such as the UE 20) in a cell according to a network load in the cell. The first preset threshold may serve as a default threshold for the UE 20. The UE 20 may control, according to the first preset threshold, a transmission mode for transmitting the cached data.

In step 303, unicast signaling sent by the base station may be received.

In step 304, a second preset threshold may be acquired by analyzing the unicast signaling. The second preset threshold may be less than the first preset threshold.

In step 305, the first preset threshold may be updated with the second preset threshold.

In step 303-step 305, when the UE 20 is of a preset user level in the cell, the UE 20 may receive unicast signaling from the eNB 10, resolve the second preset threshold corresponding to the preset user level from the unicast signaling, and update the first preset threshold with the second preset threshold. For example, the first preset threshold may be a length of 8 bits. The eNB 10 may detect that a preset user level of the UE 20 is of a platinum user. A preset threshold corresponding to a platinum user may be of 6 bits. Then, a second preset threshold of 6 bits may be sent to the UE 20. After receiving the second preset threshold, the UE 20 may update a system default threshold from 8 bits to 6 bits corresponding to the UE 20.

The second preset threshold may be resolved from the unicast signaling. As the second preset threshold is less than the first preset threshold, the UE's cached data of a smaller size may be uploaded to the base station using the flow of the method 100 (FIG. 1A), which ensures that the UE of a high user level may upload cached data to the base station as soon as possible, such that users of different levels may enjoy different transmission services in transmitting cached data.

Figure 4:
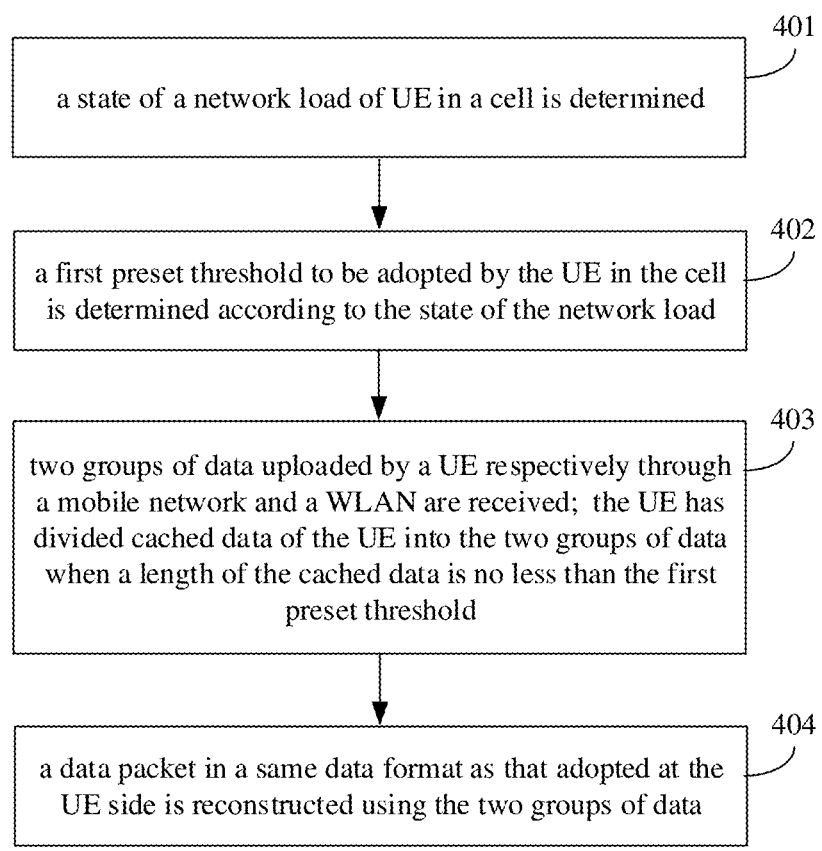
FIG. 4 is a flowchart of a method for transmitting data according to an exemplary embodiment.

FIG. 4 is a flowchart of a method 400 for transmitting data according to an exemplary embodiment. The method 400 for transmitting data may apply to an eNB. Referring to FIG. 1B and FIG. 4, the method 400 for transmitting data includes steps 401-403 as follows.

In step 401, a state of a network load of a cell where the UE is located is determined.

The eNB 10 may count a total amount of data transmitted by all UE in the cell (e.g., all UE in Cell 11) through the mobile network, and determine, through the total amount of data, the state of the load the UE in the Cell 11 put on the mobile network. The state of the network load may be: smooth data transmission, congested data transmission, etc., for example.

In step 402, a first preset threshold to be adopted by the UE in the cell is determined according to the state of the network load.

In case of smooth data transmission, a large first preset threshold, such as of 12 bits, may be set, such that the UE 20 may transmit data to the eNB 10 stably through the mobile network, avoiding unnecessary grouping/division of the cached data, improving data transmitting performance of the UE 20.

In step 403, two groups of data uploaded by a UE respectively through a mobile network and a WLAN are received. The UE has divided cached data of the UE into the two groups of data when a length of the cached data is no less than the first preset threshold.

In step 404, a data packet in a same data format as that adopted at the UE side is reconstructed using the two groups of data.

As shown in FIG. 1B, the eNB 10 may receive data packets of a first group of data transmitted through the first link 141 of the mobile network and of a second group of data forwarded by the AP 30 transmitted through the second link 142 of the WLAN, and then identify, from the data packets, the respective identifiers, including identifiers respectively for identifying the first group of data and the second group of data, and position identifiers respectively for identifying positions of the first group of data and the second group of data in all data sent by the UE 20. The eNB 10 may identify the first group of data and the second group of data according to these identifiers, and may reconstruct the cached data originally generated by the UE using the first group of data and the second group of data according to these identifiers.

With the method 400, the UE may be allowed to control a data transmission mode according to the first preset threshold, such that resources of the mobile network and of the WLAN may be better integrated, improving utilization of the WLAN, greatly relieving a burden of the mobile network in data transmission, improving UE performance in data transmission. The two groups of data acquired by grouping, by the UE, cached data may be received respectively through two independent communication networks, i.e., the mobile network and the WLAN. The cached data sent by the UE may be reconstructed/recombined, such that no data may be loss during data processing, greatly relieving a burden of data transmission by the UE through the mobile network, improving user experience.

The method 400 for transmitting data may further include the following steps.

Among all UE in a cell, a UE with a preset user level may be determined. A second preset threshold corresponding to the preset user level may be determined. The second preset threshold may be sent to the UE with the preset user level.

The second preset threshold may be sent to the UE with the preset user level by: including the second preset threshold in unicast signaling; and sending the unicast signaling to the UE with the preset user level. The unicast signaling may include the second preset threshold.

The first preset threshold may be sent to UE in the cell by: including the first preset threshold in broadcast signaling; and sending the broadcast signaling to the UE in the cell.

With the method 400, a UE may control, according to the first preset threshold, a transmission mode for transmitting cached data, thereby better integrating resources of the mobile network and the WLAN.

Figure 5:
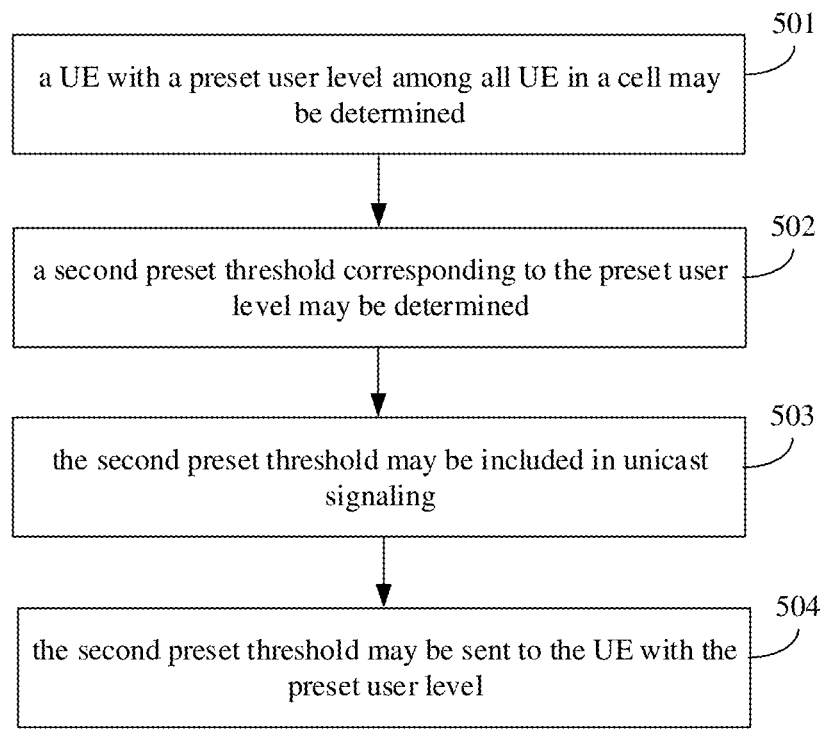
FIG. 5 is a flowchart of a method for transmitting data according to an exemplary embodiment.

FIG. 5 is a flowchart of a method 500 for transmitting data according to an exemplary embodiment. The method 500 may be used with the method 100 (FIG. 1A) for updating a first preset threshold. Referring to FIG. 1B and FIG. 5, the method 500 may include the following steps.

In step 501, a UE with a preset user level among all UE in a cell may be determined.

In step 502, a second preset threshold corresponding to the preset user level may be determined.

In step 503, the second preset threshold may be included in unicast signaling.

In step 504, the second preset threshold may be sent to the UE with the preset user level.

In the exemplary scene shown in FIG. 1B, the eNB 10 may determine that the UE 20 is of a preset user level in a cell, determine a second preset threshold corresponding to the preset user level, and send unicast signaling to the UE 20, such that the UE 20 may resolve the second preset threshold corresponding to the preset user level from the unicast signaling, and update the first preset threshold with the second preset threshold. For example, the first preset threshold may be a length of 8 bits. The eNB 10 may detect that a preset user level of the UE 20 is of a platinum user. A preset threshold corresponding to a platinum user may be of 6 bits. Then, a second preset threshold of 6 bits may be sent to the UE 20. After receiving the second preset threshold, the UE 20 may update a system default threshold from 8 bits to 6 bits corresponding to the UE 20.

A base station may determine a UE with a preset user level among all UE in the cell; determine a second preset threshold corresponding to the preset user level; include the second preset threshold in unicast signaling; and send the unicast signaling to the UE with the preset user level. As the second preset threshold is less than the first preset threshold, the UE's cached data of a smaller size may be uploaded to the base station using the flow of the method 100 (FIG. 1A), which ensures that UE of a high level may upload cached data to the base station as soon as possible, such that users of different levels may enjoy different transmission services in transmitting cached data.

FIG. 6 is a block diagram of a device 600 for transmitting data according to an exemplary embodiment. As shown in FIG. 6, the device 600 for transmitting data includes: a data dividing module 61 configured for, in response to determining that a length of cached data is no less than a first preset threshold, processing, in a preset mode, the cached data to obtain a first group of data and a second group of data; and a first data transmitting module 62 configured for uploading the first group of data and the second group of data obtained by the data dividing module 61 to a base station respectively through a mobile network and a wireless local area network (WLAN).

FIG. 7 is a block diagram of a device 700 for transmitting data according to an exemplary embodiment. As shown in FIG. 7, based on the embodiment as shown in FIG. 6, the device 700 may further include: a signal strength determining and comparing module 63 configured for, in response to determining that the length of the cached data is less than the first preset threshold, determining a signal strength of the mobile network and a signal strength of the WLAN, and comparing the determined signal strength of the mobile network and the determined signal strength of the WLAN; a second data transmitting module 64 configured for, when the signal strength determining and comparing module 63 determines that the signal strength of the mobile network is no less than the signal strength of the WLAN, transmitting the cached data through the mobile network; and a third data transmitting module 65 configured for, when the signal strength determining and comparing module 63 determines that the signal strength of the mobile network is less than the signal strength of the WLAN, transmitting the cached data through the WLAN.

The device 700 may further include: a broadcast signaling receiving module 66 configured for receiving broadcast signaling sent by the base station; and a first threshold acquiring module 67 configured for acquiring the first preset threshold by analyzing the broadcast signaling received by the broadcast signaling receiving module 66, such that the data dividing module 61 may group the cached data according to the preset mode when the length of the cached data is no less than the first preset threshold.

The device 700 may further include: a unicast signaling receiving module 68 configured for receiving unicast signaling sent by the base station; a second threshold acquiring module 69 configured for acquiring a second preset threshold by analyzing the unicast signaling received by the unicast signaling receiving module 68, the second preset threshold being less than the first preset threshold; and a threshold updating module 70 configured for updating the first preset threshold acquired by the first threshold acquiring module 67 with the second preset threshold acquired by the second threshold acquiring module 69, such that the data dividing module 61 may group the cached data according to the preset mode when the length of the cached data is no less than the second preset threshold.

The cached data may be stored in a PDCP cache.

Figure 8:
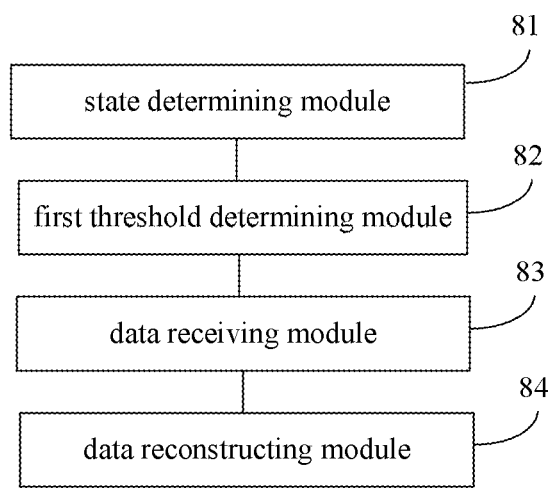
FIG. 8 is a block diagram of a device for transmitting data according to an exemplary embodiment.

FIG. 8 is a block diagram of a device 800 for transmitting data according to an exemplary embodiment. As shown in FIG. 8, the device 800 for transmitting data includes: a state determining module 81 configured for determining a state of a network load of a cell where the UE is located; and a first threshold determining module 82 configured for determining, according to the state of the network load determined by the state determining module 81, a first preset threshold to be adopted by the UE in the cell.

The device 800 also includes a data receiving module 83 configured for receiving two groups of data uploaded by a UE respectively through a mobile network and a wireless local area network (WLAN); the UE having divided cached data of the UE into the two groups of data when a length of the cached data is no less than the first preset threshold determined by the first threshold determining module 82; and a data reconstructing module 84 configured for reconstructing, using the two groups of data received by the data receiving module 83, a data packet in a data format same as that adopted at the UE side.

Figure 9:
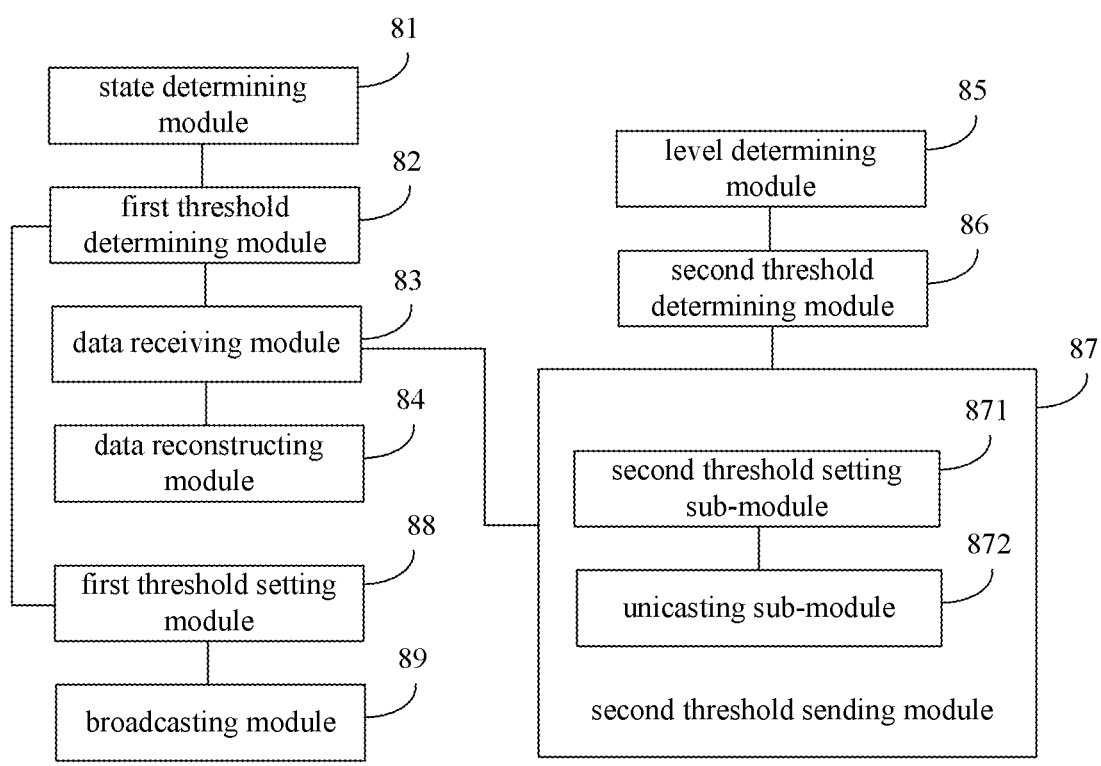
FIG. 9 is a block diagram of a device for transmitting data according to an exemplary embodiment.

FIG. 9 is a block diagram of a device 900 for transmitting data according to an exemplary embodiment herein. As shown in FIG. 9, based on the embodiment as shown in FIG. 8, the device 900 may further include: a level determining module 85 configured for determining, among all UE in the cell, a UE with a preset user level; a second threshold determining module 86 configured for determining a second preset threshold corresponding to the preset user level determined by the level determining module 85; and a second threshold sending module 87 configured for sending the second preset threshold determined by the second threshold determining module 86 to the UE with the preset user level.

The second threshold sending module 87 may include: a second threshold setting sub-module 871 configured for including the second preset threshold in unicast signaling; and a unicasting sub-module 872 configured for sending the unicast signaling including the second preset threshold set by the second threshold setting sub-module 871 to the UE with the preset user level.

When the length of the cached data of the UE is no less than the second preset threshold determined by the second threshold setting sub-module 871, the data receiving module 83 may receive groups of data respectively through the mobile network and the WLAN. The UE may have divided the cached data into the groups of data.

The device 900 may further include: a first threshold setting module 88 configured for including the first preset threshold determined by the first threshold determining module 82 in broadcast signaling; and a broadcasting module 89 configured for: sending the broadcast signaling to UE in the cell. The broadcast signaling may include the first preset threshold set by the first threshold setting module 88.

Figure 10:
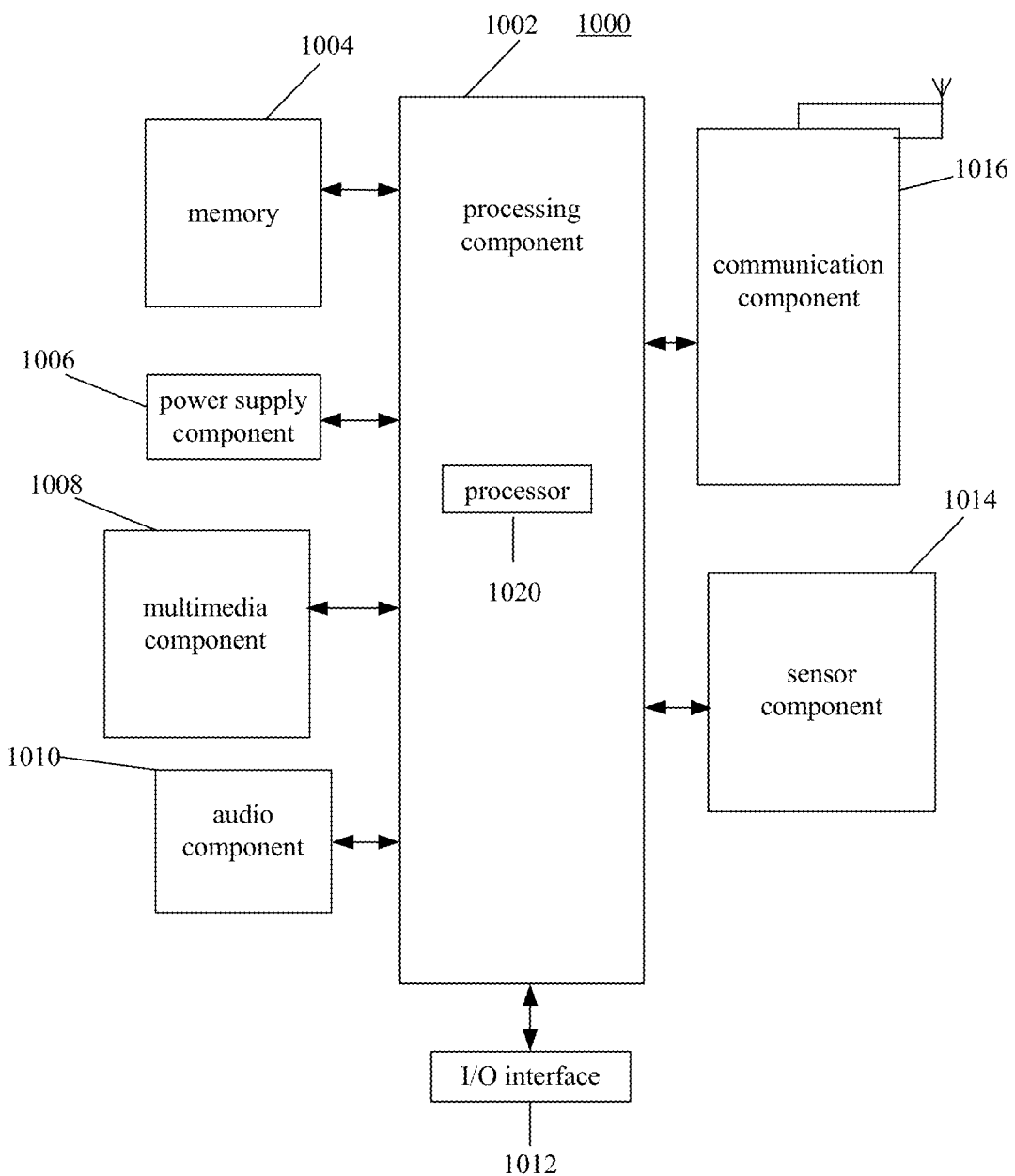
FIG. 10 is a block diagram of a device for data transmission according to an exemplary embodiment.

FIG. 10 is a block diagram of a device 1000 for data transmission according to an exemplary embodiment. For example, the device 1000 may be a UE such as a mobile phone, a computer, a digital broadcasting terminal, a message transceiver, a game console, a tablet device, a medical device, a fitness device, a Personal Digital Assistant (PDA), and/or the like.

Referring to FIG. 10, the device 1000 may include one or more components as follows: a processing component 1002, memory 1004, a power supply component 1006, a multimedia component 1008, an audio component 1010, an Input/Output (I/O) interface 1012, a sensor component 1014, and a communication component 1016.

The processing component 1002 generally controls an overall operation of the device 1000, such as operations associated with display, a telephone call, data communication, a camera operation, and a recording operation. The processing component 1002 may include one or more processors 1020 to execute instructions so as to complete all or some options of the method. In addition, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 may be configured for storing various types of data to support the operation on the device 1000. Example of such data may include instructions of any application or method configured for operating on the device 1000, contact data, phonebook data, messages, pictures, videos, and/or the like. The memory 1004 may be realized by any type of volatile or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 1006 may supply electric power to various components of the device 1000. The power supply component 1006 may include a power management system, one or more power sources, and other components related to generating, managing and distributing electricity for the device 1000.

The multimedia component 1008 may include a screen providing an output interface between the device 1000 and a user. The screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. The multimedia component 1008 may include a front camera and/or a rear camera. When the device 1000 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 1010 may be configured for outputting and/or inputting an audio signal. For example, the audio component 1010 may include a microphone (MIC). When the device 1000 is in an operation mode such as a call mode, a recording mode, and a voice recognition mode, the MIC may be configured for receiving an external audio signal. The received audio signal may be further stored in the memory 1004 or may be sent via the communication component 1016. The audio component 1010 may further include a loudspeaker configured for outputting the audio signal.

The I/O interface 1012 may provide an interface between the processing component 1002 and a peripheral interface module. Such a peripheral interface module may be a keypad, a click wheel, a button or the like. Such a button may include but is not limited to: a homepage button, a volume button, a start button, and a lock button.

The sensor component 1014 may include one or more sensors for assessing various states of the device 1000. For example, the sensor component 1014 may detect an on/off state of the device 1000 and relative positioning of components such as the display and the keypad of the device 1000. The sensor component 1014 may further detect a change in the position of the device 1000 or of a component of the device 1000, whether there is contact between the device 1000 and a user, the orientation or acceleration/deceleration of the device 1000, and a change in the temperature of the device 1000. The sensor component 1014 may include a proximity sensor configured for detecting existence of a nearby object without physical contact. The sensor component 1014 may further include an optical sensor such as a Complementary Metal-Oxide-Semiconductor (CMOS) or Charge-Coupled-Device (CCD) image sensor used in an imaging application. The sensor component 1014 may further include an acceleration sensor, a gyroscope sensor, a magnetic sensor, a pressure sensor, a microwave sensor, or a temperature sensor.

The communication component 1016 may be configured for facilitating wired or wireless communication between the device 1000 and other equipment. The device 1000 may access a wireless network based on a communication standard such as WiFi, 2G or 3G, or combination thereof. The communication component 1016 may receive a broadcast signal or broadcast related information from an external broadcast management system via a broadcast channel. The communication component 1016 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and other technologies.

The device 1000 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components to implement the method.

A non-transitory computer-readable storage medium including instructions, such as memory 1004 including instructions, may be provided. The instructions may be executed by the processor 1020 of the device 1000 to implement the above described methods. For example, the non-transitory computer-readable storage medium may be a Read-Only Memory (ROM), a Compact Disc Read-Only Memory (CD-ROM), a magnetic tape, a floppy disk, optical data storage equipment, etc.

The processor 1020 is configured to determine whether a length of cached data of a UE is no less than a first preset threshold; in response to determining that the length of the cached data of the UE is no less than the first preset threshold, dividing, in a preset mode, the cached data into two groups of data; and uploading the two groups of data to a base station respectively through a mobile network and a WLAN.

Figure 11:
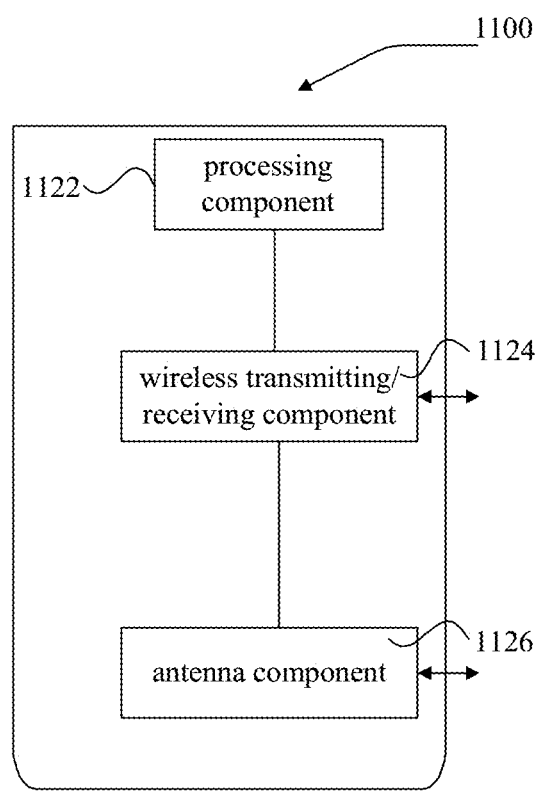
FIG. 11 is a block diagram of a device for data transmission according to an exemplary embodiment.

FIG. 11 is a block diagram of a device 1100 for data transmission according to an exemplary embodiment. The device 1100 may be provided as a base station. Referring to FIG. 11, the device 1100 includes a processing component 1122, a wireless transmitting/receiving component 1124, an antenna component 1126, and a signal processing part dedicated to a wireless interface (not shown). The processing component 1122 may further include one or more processors.

The processing component 1122 may be configured to: determine a state of a network load of a cell where the UE is located; determine, according to the state of the network load, a first preset threshold to be adopted by the UE; when a length of cached data of a UE is no less than the first preset threshold, receiving two groups of data respectively through a mobile network and a WLAN; the UE having divided the cached data into the two groups of data; and reconstructing, using the two groups of data, a data packet in a data format same as that adopted at the UE side.

Other embodiments herein will be apparent to those skilled in the art from consideration of the specification and practice of the invention disclosed here. This application is intended to cover any variations, uses, or adaptations of the disclosure following the general principles thereof and including such departures from the present disclosure as come within known or customary practice in the art. The specification and the embodiments are intended to be exemplary only, with a true scope and spirit of the disclosure being indicated by the appended claims.

Note that the present disclosure is not limited to the exact construction that has been described above and illustrated in the accompanying drawings, and that various modifications and changes can be made without departing from the scope thereof. It is intended that the scope of the present disclosure be limited only by the appended claims.

What is claimed is:

1. A method for transmitting data by user equipment (UE), comprising:
   receiving unicast signaling sent by a base station;
   acquiring a preset threshold by analyzing the unicast signaling, wherein the preset threshold corresponds to a preset user level of the UE in a cell;
   determining whether a length of cached data of the UE is no less than the preset threshold;
   in response to determining that the length of the cached data of the UE is no less than the preset threshold, dividing, in a preset mode, the cached data into two groups of data, wherein the cached data is stored in a Packet Data Convergence Protocol (PDCP) cache; and
   uploading the two groups of data to the base station respectively through a mobile network and a wireless local area network (WLAN).

2. The method according to claim 1, further comprising:
   in response to determining that the length of the cached data is less than the preset threshold, determining a signal strength of the mobile network and a signal strength of the WLAN, and comparing the determined signal strength of the mobile network and the determined signal strength of the WLAN;
   in response to determining that the signal strength of the mobile network is no less than the signal strength of the WLAN, transmitting the cached data through the mobile network; and
   in response to determining that the signal strength of the mobile network is less than the signal strength of the WLAN, transmitting the cached data through the WLAN.

3. The method according to claim 1, wherein the preset threshold is a second preset threshold, the method further comprising:
   receiving broadcast signaling sent by the base station; and
   acquiring a first preset threshold by analyzing the broadcast signaling.

4. The method according to claim 3, further comprising:
updating the first preset threshold with the second preset threshold, the second preset threshold being less than the first preset threshold.

5. A method for receiving transmitted data, comprising:
determining user equipment (UE) with a preset user level in a cell;
determining a preset threshold corresponding to the preset user level;
sending the preset threshold to the UE with the preset user level;
receiving two groups of data uploaded by the UE respectively through a mobile network and a wireless local area network (WLAN), wherein the UE divides cached data stored in a Packet Data Convergence Protocol (PDCP) cache into the two groups of data in response to determining that a length of the cached data is no less than the first preset threshold; and
reconstructing, using the two groups of data, a data packet in a same data format as that adopted at the UE.

6. The method according to claim 5, wherein the preset threshold is a second preset threshold, the method further comprising:
determining a state of a network load of the cell where the UE is located; and
determining, according to the state of the network load, a first preset threshold to be adopted by the UE.

7. The method according to claim 6, wherein the sending the second preset threshold to the UE with the preset user level comprises:
including the second preset threshold in unicast signaling; and
sending the unicast signaling to the UE with the preset user level, the unicast signaling comprising the second preset threshold.

8. The method according to claim 6, further comprising:
including the first preset threshold in broadcast signaling; and
sending the broadcast signaling to the UE in the cell.

9. User equipment (UE), comprising:
a processor; and
a memory storing instructions executable by the processor,
wherein the processor is configured to:
receive unicast signaling sent by a base station;
acquire a preset threshold by analyzing the unicast signaling, wherein the preset threshold corresponds to a preset user level of the UE in a cell;
determine whether a length of cached data of the UE is no less than the preset threshold;
in response to determining that the length of the cached data of the UE is no less than the preset threshold, divide, in a preset mode, the cached data into two groups of data, wherein the cached data is stored in a Packet Data Convergence Protocol (PDCP) cache; and
upload the two groups of data to the base station respectively through a mobile network and a wireless local area network (WLAN).

10. The UE according to claim 9, wherein the processor is further configured to:
in response to determining that the length of the cached data is less than the preset threshold, determine a signal strength of the mobile network and a signal strength of the WLAN, and compare the determined signal strength of the mobile network and the determined signal strength of the WLAN;
in response to determining that the signal strength of the mobile network is no less than the signal strength of the WLAN, transmit the cached data through the mobile network; and
in response to determining that the signal strength of the mobile network is less than the signal strength of the WLAN, transmit the cached data through the WLAN.

11. The UE according to claim 9, wherein the preset threshold is a second preset threshold, and the processor is further configured to:
receive broadcast signaling sent by the base station; and
acquire a first preset threshold by analyzing the broadcast signaling.

12. The UE according to claim 11, wherein the processor is further configured to:
update the first preset threshold with the second preset threshold, the second preset threshold being less than the first preset threshold.

13. A base station, comprising:
a processor; and
a memory storing instructions executable by the processor,
wherein the processor is configured to:
determine user equipment (UE) with a preset user level in a cell;
determine a preset threshold corresponding to the preset user level;
send the preset threshold to the UE with the preset user level;
receive two groups of data uploaded by the UE respectively through a mobile network and a wireless local area network (WLAN), wherein the UE divides cached data stored in a Packet Data Convergence Protocol (PDCP) cache into the two groups of data in response to determining that a length of the cached data is no less than the preset threshold; and
reconstruct, using the two groups of data, a data packet in a same data format as that adopted at the UE.

14. The base station according to claim 13, wherein the preset threshold is a second preset threshold, and the processor is further configured to:
determine a state of a network load of the cell where the UE is located; and
determine, according to the state of the network load, a first preset threshold to be adopted by the UE.

15. The base station according to claim 14, wherein the processor is further configured to:
include the second preset threshold in unicast signaling; and
send the unicast signaling to the UE with the preset user level, the unicast signaling including the second preset threshold.

16. The base station according to claim 14, wherein the processor is further configured to:
include the first preset threshold in broadcast signaling; and
send the broadcast signaling to the UE in the cell.

* * * * *